US011545765B2

(12) United States Patent
Tian

(10) Patent No.: US 11,545,765 B2
(45) Date of Patent: Jan. 3, 2023

(54) CONDUCTIVE FASTENING MECHANISM

(71) Applicant: Shandong Dingfeng Aviation Technology Co., Ltd., Jining (CN)

(72) Inventor: Yu Tian, Hong Kong (CN)

(73) Assignee: SHANDONG DINGFENG AVIATION TECHNOLOGY CO., LTD., Jining (CN)

( * ) Notice: Subject to any disclaimer, the term of this patent is extended or adjusted under 35 U.S.C. 154(b) by 0 days.

(21) Appl. No.: 17/223,008

(22) Filed: Apr. 6, 2021

(65) Prior Publication Data

US 2021/0320439 A1 Oct. 14, 2021

(30) Foreign Application Priority Data

Apr. 9, 2020 (CN) .......................... 202010274441.6

(51) Int. Cl.
*H01R 4/56* (2006.01)
(52) U.S. Cl.
CPC ..................................... *H01R 4/56* (2013.01)
(58) Field of Classification Search
CPC ...... H01R 4/56; H01R 4/5008; H01R 11/282; H01R 11/283; H01R 11/286; H01R 11/287; H01R 11/288; H01R 13/621
See application file for complete search history.

(56) References Cited

U.S. PATENT DOCUMENTS 5,024,619 A * 6/1991 Caraballo ............ H01R 11/282
439/773

* cited by examiner

*Primary Examiner* — Vanessa Girardi
(74) *Attorney, Agent, or Firm* — WPAT Law, P.C.; Anthony King

(57) ABSTRACT

A conductive fastening mechanism including a nut connected to an energy load module and electrically connected to a power supply through a power switch S0; an anti-rotating seat located above the nut; a conducting element arranged in the anti-rotating seat and electrically connected to a load; a connecting piece penetrating the anti-rotating seat and the conducting element and selectively connected to the nut, used for on-off between the load and the power supply; a handle rotatably arranged on the connecting piece, where the handle is configured to be selectively clamped in the anti-rotating seat to limit the connecting piece. The handle is rotatably arranged on the connecting piece and can be selectively clamped on the anti-rotating seat, such that the handle plays a role in preventing the connecting piece from rotating, so as to achieve the purpose of anti-vibration and anti-loosening, prevent damage and other safety accidents, and improve safety.

9 Claims, 4 Drawing Sheets

CONDUCTIVE FASTENING MECHANISM

TECHNICAL FIELD

The present disclosure relates to the technical field of machining, and in particular, to a conductive fastening mechanism.

BACKGROUND

Fasteners are inseparable in connection and assembly of various machines and components. The fasteners bring convenience to the machinery industry, but they have an inevitable disadvantage, that is, they will loosen by themselves in severe vibration, causing damage, disassembly, or even major accidents to components or a complete device. At present, the anti-loosening fastening structure on the market is complicated in assembly and high in production cost, and cannot be repeatedly disassembled and assembled, which affects production efficiency.

SUMMARY

An objective of the present disclosure is to provide a conductive fastening mechanism, which is used for quick disassembly and assembly, is easy to assembly and has high production efficiency.

To achieve the objective, the present disclosure adopts the following technical solution:

a conductive fastening mechanism, including:

a nut connected to an energy load module and electrically connected to a power supply through a power switch S0;

an anti-rotating seat located above the nut;

a conducting element arranged in the anti-rotating seat and electrically connected to a load;

a connecting piece penetrating the anti-rotating seat and the conducting element and selectively connected to the nut, used for on-off between the load and the power supply; and a handle rotatably arranged on the connecting piece, where the handle is configured to be selectively clamped in the anti-rotating seat to limit the connecting piece.

Preferably, the connecting piece includes:

a mounting portion, where the mounting portion is provided with a mounting hole, the mounting hole is used for a wrench to penetrate, and the handle is rotatably arranged on the mounting portion; and a screw arranged at the bottom of the mounting portion, where the screw penetrates the anti-rotating seat and is in threaded connected with the nut.

Preferably, the conductive fastening mechanism further includes a rotating shaft, where the connecting piece is provided with through holes, and two ends of the rotating shaft are connected to the handle and penetrate the through holes.

Preferably, the handle includes:

a connecting portion rotatably arranged on the connecting piece through the rotating shaft; and a clamping portion arranged on the connecting portion and capable of being clamped to the anti-rotating seat.

Preferably, an inner wall of the anti-rotating seat is provided with a clamping groove, and the clamping portion can be clamped in the clamping groove.

Preferably, at least two clamping blocks are arranged on the inner wall of the anti-rotating seat, and the clamping groove is formed between two adjacent clamping blocks.

Preferably, there are a plurality of clamping grooves, and the plurality of clamping grooves are evenly arranged in a circumferential direction of the anti-rotating seat.

Preferably, a cross section of the clamping portion has a trapezoidal structure.

Preferably, the anti-rotating seat is provided with a via hole in an axial direction, and the connecting piece penetrates the via hole.

Preferably, an outer wall of a lower end of the connecting piece is provided with an external thread, and the nut is internally provided with an internal thread matched with the external thread.

The present disclosure has the following beneficial effects:

When the conductive fastening mechanism according to the present disclosure needs to be fastened, a connecting piece penetrates an anti-rotating seat and is connected to a nut for fixation, and then a handle is rotated in a direction close to the anti-rotating seat and is clamped in the anti-rotating seat, to implement the fastening process; when the conductive fastening mechanism needs to be loosened, the handle is rotated in a direction away from the anti-rotating seat and is separated from the anti-rotating seat, and the handle releases the restriction on the connecting piece, so that the connecting piece can be unscrewed in a reverse direction, and the connecting piece is separated from the nut to implement the loosening process. Through this arrangement, the conductive fastening mechanism is simple to assemble and low in production cost, can meet needs for quick disassembly and assembly, can be repeatedly operated, and improves operation efficiency. In addition, the handle is rotatably arranged on the connecting piece and can be selectively clamped on the anti-rotating seat, such that the handle plays a role in preventing the connecting piece from rotating, and a user does not need to worry about loosening of the connecting piece caused by factors such as vibration, thereby achieving the purpose of anti-vibration and anti-loosening, preventing damage and other safety accidents, and improving safety.

1. Nut; 2. Anti-rotating seat; 3. Connecting piece; 4. Handle; 5. Rotating shaft; 6. First power line; 7. Conductive connecting piece; 8. Conducting element; 9. Second power line; 10. Frame; 11. Energy load module; 12. Bolt; 13. Load;

21. Clamping groove; 22. Clamping block;

31. Mounting portion; 32. Screw;

41. Connecting portion; 42. Clamping portion.

DESCRIPTION OF THE EMBODIMENTS

In order to make the technical problems solved by the present disclosure, the adopted technical solutions, and the achieved technical effects clearer, the technical solutions of the embodiments of the present disclosure will be described in further detail below in conjunction with the accompanying drawings. Obviously, the described embodiments are only some embodiments of the present disclosure, and are not all embodiments. All other embodiments obtained by a person skilled in the art based on the embodiments of the present disclosure without creative efforts shall fall within the protection scope of the present disclosure.

In the description of the present disclosure, unless otherwise clearly specified and defined, the terms "connected", "coupled", and "fixed" should be understood in a broad sense. For example, it can be a fixed connection, a detachable connection, or integration. It can be a mechanical connection or an electrical connection. It can be a direct connection, or an indirect connection through an intermediate medium. It can also be an intercommunication between two elements or the interaction between two elements. Those of ordinary skill in the art can understand the specific meanings of the above terms in the present disclosure according to specific situations.

In the present disclosure, unless otherwise clearly defined and defined, the first feature being "above" or "under" the second feature may include that the first and second features are in direct contact, or may include that the first and second features are not in direct contact but in contact through other features between them. Moreover, the first feature being "on", "at the upper side of" and "on the upper surface of" the second feature includes that the first feature is right above and at the oblique upper side of the second feature, or only indicates that the horizontal height of the first feature is greater than that of the second feature. the first feature being "below", "at the lower side of" and "on the lower surface of" the second feature includes that the first feature is right below and at the oblique lower side of the second feature, or only indicates that the horizontal height of the first feature is less than that of the second feature.

The technical solutions of the present disclosure will be further described below in conjunction with the accompanying drawings and specific implementations.

Figure 1:
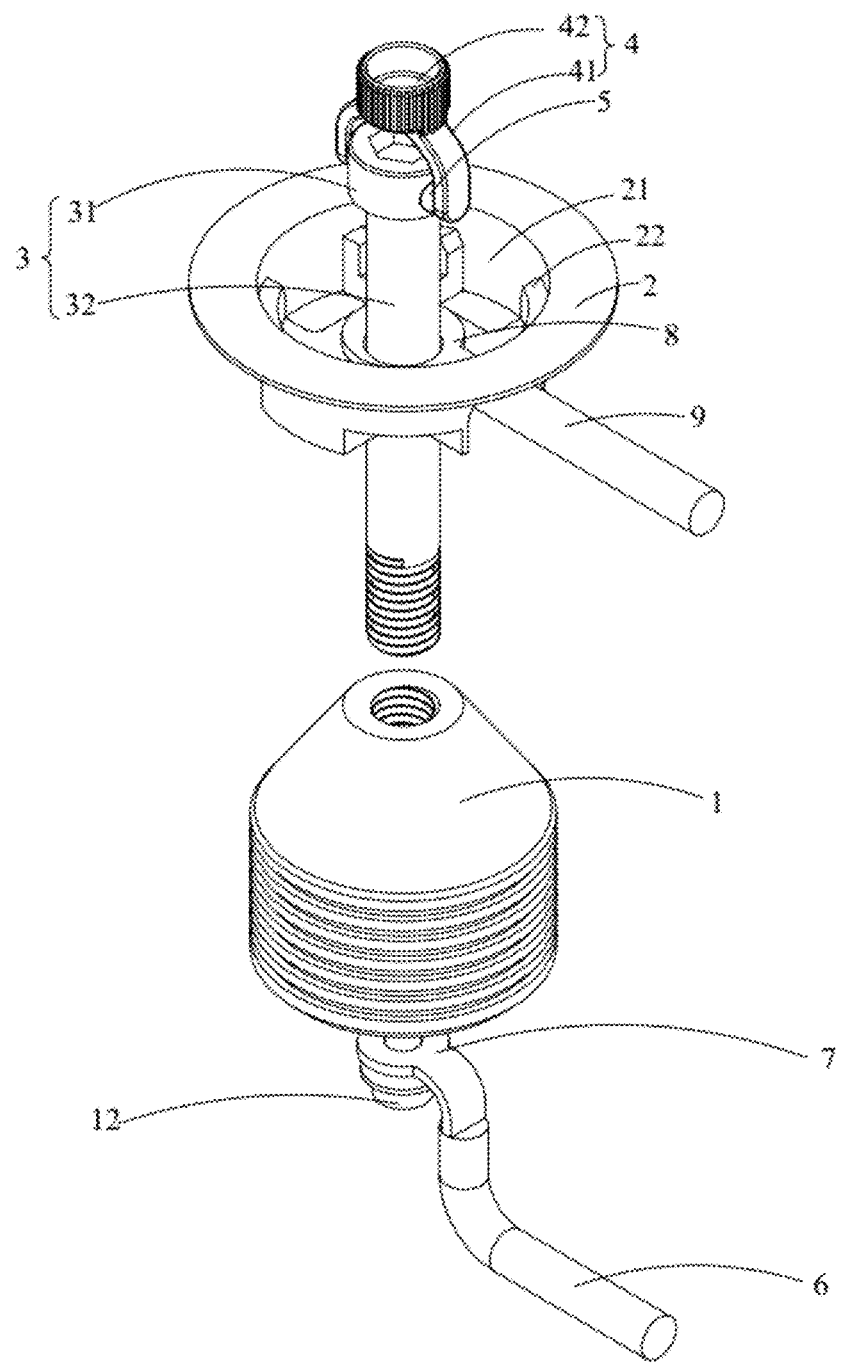
FIG. 1 is a schematic structural diagram of a conductive fastening mechanism according to the present disclosure.

This embodiment provides a conductive fastening mechanism, which is suitable for connecting and assembling parts in machining. As shown in FIG. 1, the conductive fastening mechanism includes: a nut 1, an anti-rotating seat 2, a connecting piece 3, and a handle 4. The nut 1 serves as an overall support, and the nut 1 is fixedly connected to an energy load module 11 and is electrically connected to a power supply through a power switch S0. The anti-rotating seat 2 is arranged above the nut 1, the connecting piece 3 penetrates the anti-rotating seat 2 and a conducting element 8 and is selectively connected to the nut 1, and the connecting piece 3 functions as an intermediate connection and is used for on-off between a load 13 and the power supply. The handle 4 is rotatably arranged on the connecting piece 3, where the handle 4 is configured to be selectively clamped in the anti-rotating seat 2 to limit the connecting piece 3 and prevent the connecting piece 3 from rotating.

Specifically, as shown in FIG. 1, the bottom of the nut 1 is provided with a conductive connecting piece 7, and the conductive connecting piece 7 is also called a copper nose; the conductive connecting piece 7 is fixed to a lower end of the nut 1 through a bolt 12, the conductive connecting piece 7 is electrically connected to a first power line 6, one end of the first power line 6 away from the conductive connecting piece 7 is connected to the power supply through the power switch S0, and the power switch S0 is a main switch of the entire circuit.

The conducting element 8 is arranged at the center of the anti-rotating seat 2, and the conducting element 8 is also called a copper nose. The conducting element 8 and the anti-rotating seat 2 are connected into an integral structure through the connecting piece 3, the conducting element 8 is electrically connected to a second power line 9, and one end of the second power line away from the conducting element 8 is electrically connected to the load 13 to play a role of conduction, where the load 13 specifically refers to a flight control avionics system of an aircraft.

Figure 2:
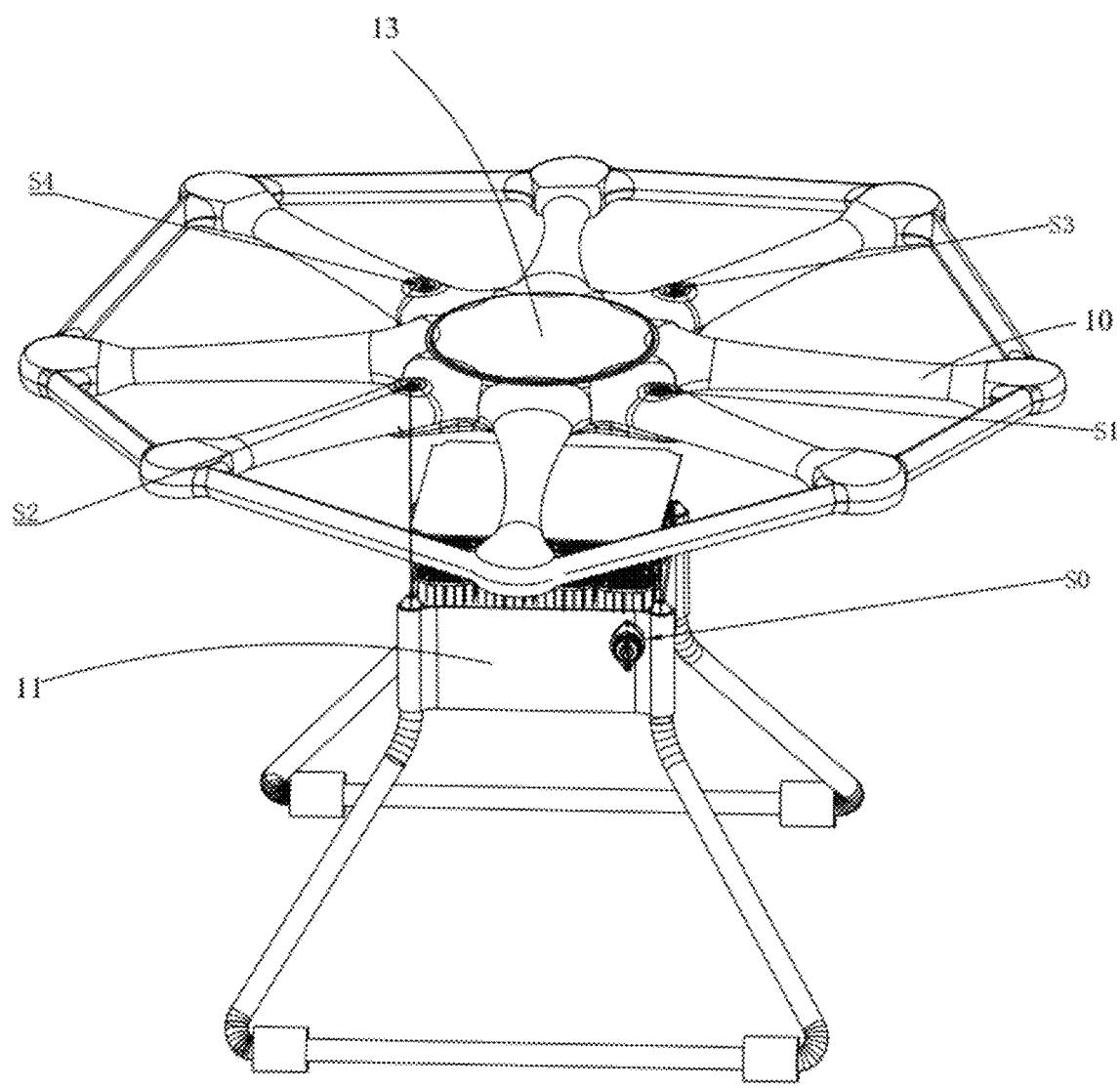
FIG. 2 is a schematic diagram of mounting the conductive fastening mechanism to an energy load module according to the present disclosure.

As shown in FIG. 2, a frame 10 is arranged on the energy load module 11. The frame 10 and the energy load module 11 are connected by four conductive fastening mechanisms. The structures of the four conductive fastening mechanisms are roughly the same. The only difference is that their positions on the frame 10 are different. The four conductive fastening mechanisms are uniformly arranged in the circumferential direction of the frame 10, and the central angle between two adjacent conductive fastening mechanisms is about 90°.

Figure 3:
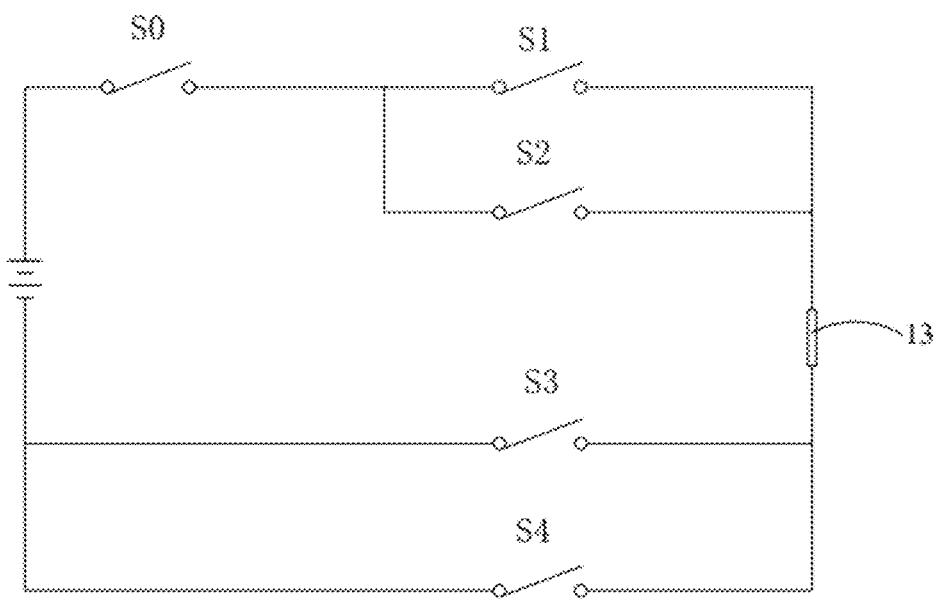
FIG. 3 is a circuit diagram of the application of the conductive fastening mechanism and the energy load module according to the present disclosure.

As shown in FIGS. 2-3, when the connecting piece 3 of each conductive fastening mechanism is connected to the nut 1, the circuit is switched on, which is equivalent to closing of the power switch. It can be understood that the four conductive fastening mechanisms correspond to a power switch S1, a power switch S2, a power switch S3, and a power switch S4, respectively. The four conductive fastening mechanisms are used to close the power switch S1, the power switch S2, the power switch S3 and the power switch S4 to enable the load 13 to be in communication connection with the energy load module 11 and the power supply through the conductive fastening mechanism.

When the conductive fastening mechanism according to the present disclosure needs to be fastened, a connecting piece 3 penetrates an anti-rotating seat 2 and is connected to a nut 1 for fixation, and then a handle 4 is rotated in a direction close to the anti-rotating seat 2 and is clamped in the anti-rotating seat 2, to implement the fastening process; when the conductive fastening mechanism needs to be loosened, the handle 4 is rotated in a direction away from the anti-rotating seat 2 and is separated from the anti-rotating seat 2, and the handle 4 releases the restriction on the connecting piece 3, so that the connecting piece 3 is unscrewed in a reverse direction, and the connecting piece 3 is separated from the nut 1 to implement the loosening process. Through this arrangement, the conductive fastening mechanism is simple to assemble and low in production cost, can meet needs for quick disassembly and assembly, can be repeatedly operated, and improves operation efficiency. In addition, the handle 4 is rotatably arranged on the connecting piece 3 and can be selectively clamped on the anti-rotating seat 2, such that the handle 4 plays a role in preventing the connecting piece 3 from rotating, and a user does not need to worry about loosening of the connecting piece 3 caused by factors such as vibration, thereby achieving the purpose of anti-vibration and anti-loosening, preventing damage and other safety accidents, and improving safety.

Figure 4:
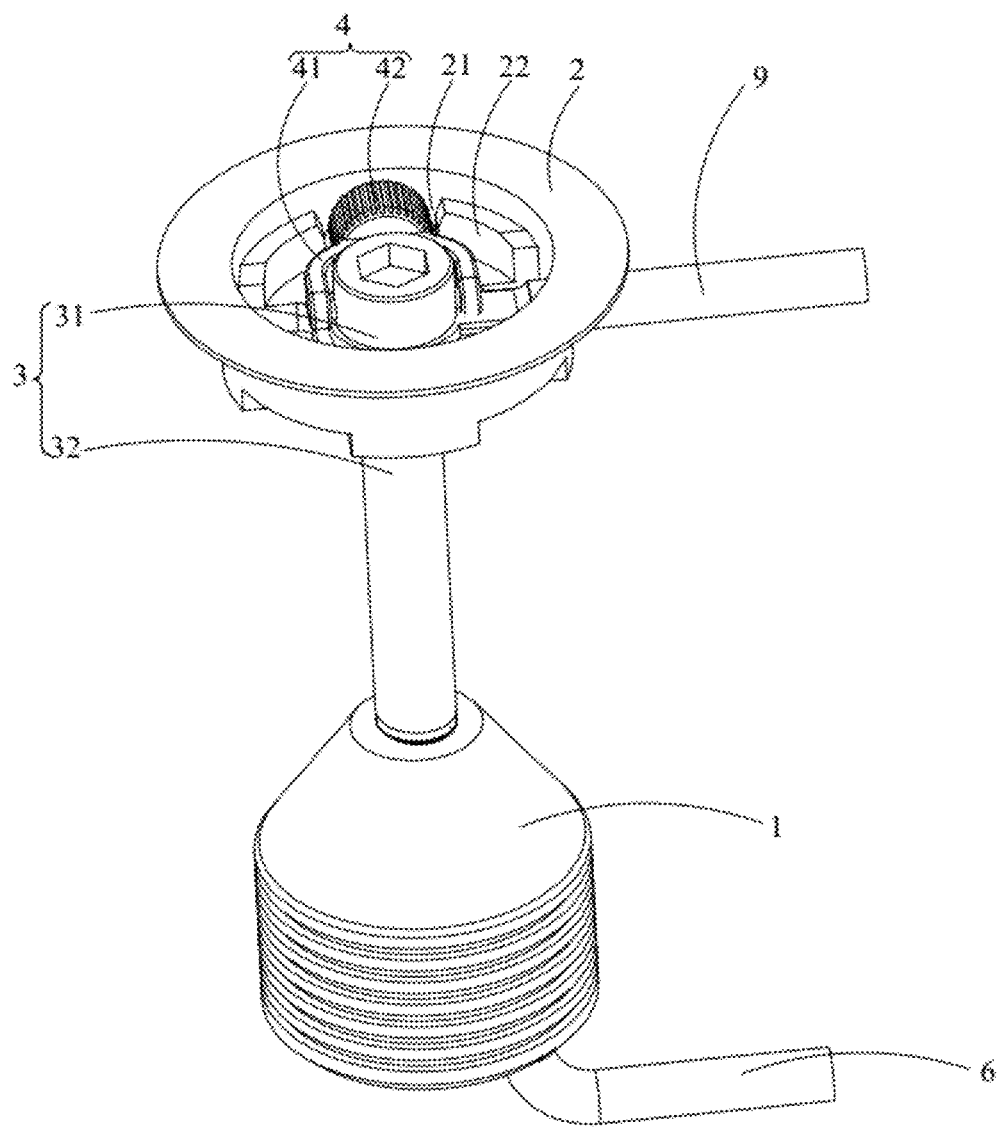
FIG. 4 is a schematic structural diagram of the conductive fastening mechanism in a fastened state according to the present disclosure.

Further, as shown in FIGS. 1 and 4, the connecting piece 3 includes a mounting portion 31 and a screw 32. The mounting portion 31 has a cylindrical structure. The top of the mounting portion 31 is provided with a mounting hole, the mounting hole is used for a wrench to penetrate, and the wrench can assist the connecting piece 3 in screwing. The mounting portion 31 is provided with the mounting hole for the wrench to extend in, so as to solve the problem that manual screwing is not in place, and reduce the labor burden over an operator. The bottom of the mounting portion 31 is provided with the screw 32, the anti-rotating seat 2 is provided with a via hole in its axial direction, and after the screw 32 of the connecting piece 3 penetrates the via hole, the screw 32 is in threaded connection with the nut 1. Specifically, an outer wall of a lower end of the screw 32 is provided with an external thread, and the nut 1 is internally provided with an internal thread matched with the external thread, so that the screw 32 is detachably connected to the nut 1, facilitating the screwing and unscrewing of the screw 32 and the nut 1.

The handle 4 is rotatably arranged on the mounting portion 31. In order to enable the handle 4 to rotate freely relative to the mounting portion 31, specifically, as shown in FIGS. 1 and 4, the conductive fastening mechanism further includes a rotating shaft 5. The mounting portion 31 of the connecting piece 3 is provided with through holes in its radial direction, and two ends of the rotating shaft 5 are connected to the handle 4 and penetrate the through holes. It can be understood that the rotating shaft 5 is pressed into the through hole by press fitting, so that the rotating shaft 5 and the through hole are in interference fit, and the handle 4 can rotate relative to the rotating shaft 5; the rotating shaft 5 and the handle 4 may have an integrally formed structure, which saves part assembly time and reduces production costs. The rotating shaft 5 and the through hole are in clearance fit, and the rotating shaft 5 and the handle 4 can rotate relative to the mounting portion 31 together.

In order to achieve the purpose of preventing rotation and loosening, the handle 4 includes a connecting portion 41 and a clamping portion 42. The connecting portion 41 has a ring structure with a semicircular cross section, which facilitates holding by an operator. The connecting portion 41 is rotatably arranged on the connecting piece 3 through the rotating shaft 5, so that the connecting portion 41 is rotated by 90° in the direction close to the anti-rotating seat 2 when in a vertical state, that is, the handle 4 can be rotated forward and reversely by 90° on the connecting piece 3. The clamping portion 42 is arranged outside the connecting portion 41, and the clamping portion 42 can be clamped to the anti-rotating seat 2 to implement the locking between the connecting piece 3 and the anti-rotating seat 2.

Specifically, an inner wall of the anti-rotating seat 2 is provided with clamping grooves 21, and the clamping portion 42 can be clamped in the clamping groove 21, which has convenience in mounting and dismantling, and facilitates maintenance. A cross section of the clamping portion 42 has a trapezoidal structure, a large end of the clamping portion 42 is toward the anti-rotating seat 2, and a small end of the clamping portion 42 is toward the connecting portion 41. The clamping effect is good and looseness does not occur easily. Correspondingly, a cross section of the clamping groove 21 also has a trapezoidal structure, and the shape of the clamping groove 21 matches the contour of the clamping portion 42.

Clamping blocks 22 and the clamping grooves 21 are staggered on the inner wall of the anti-rotating seat 2, i.e., the inner wall of the anti-rotating seat 2 is provided with at least two clamping blocks 22, and the clamping groove 21 is formed between two adjacent clamping blocks 22. There are a plurality of clamping grooves 21, and the plurality of clamping grooves 21 are evenly arranged in a circumferential direction of the anti-rotating seat 2. Each of the clamping grooves 21 is a groove position of one clamping portion 42, so that the anti-rotating seat 2 internally has a plurality of clamping positions, such that when the clamping portion 42 of the handle 4 rotates to any angle, a suitable clamping position is available for matching the clamping portion 42.

The working process of the conductive fastening mechanism provided in this embodiment is as follows:

When the conductive fastening mechanism needs to be fastened, a connecting piece 3 penetrates an anti-rotating seat 2, and a wrench penetrates a mounting hole of a mounting portion 31; by means of the wrench, a screw 32 is in threaded connection with a nut 1 for fixation, and then a handle 4 is rotated in a direction close to the anti-rotating seat 2 and is clamped in the anti-rotating seat 2, to implement the fastening process;

when the conductive fastening mechanism needs to be loosened, the handle 4 is rotated in a direction away from the anti-rotating seat 2 and is separated from the anti-rotating seat 2, and the handle 4 releases the restriction on the connecting piece 3; the wrench penetrates the mounting hole of a mounting portion 31, the connecting piece 3 can be unscrewed in a reverse direction by means of the wrench, and the screw 32 and the nut 1 are separated to implement the loosening process.

In the description herein, it should be understood that the orientation or position relationship indicated by the terms "up", "down", "left" and "right" is based on the orientation or position relationship shown in the accompanying drawings, and these terms are just used to facilitate descriptions and simplify operations, but not to indicate or imply that the mentioned device or elements must have a specific orientation and must be established and operated in a specific orientation, and thus, these terms cannot be understood as a limitation to the present disclosure. In addition, the terms "first" and "second" are only used to distinguish in description, and have no special meaning.

In the description of the specification, descriptions referring to the terms such as "an embodiment" or "example" mean that specific features, structures, materials or characteristics described with reference to this embodiment or example are included in at least one embodiment or example of the present disclosure. In this specification, the illustrative expressions of the above terms do not necessarily refer to the same embodiments or examples.

In addition, the above descriptions are only preferred embodiments of the present disclosure and the applied technical principles. Those skilled in the art will understand that the present disclosure is not limited to the specific embodiments described herein, and various obvious changes, readjustments and replacements can be made by those skilled in the art without departing from the protection scope of the present disclosure. Therefore, although the present disclosure has been described in more detail through the above embodiments, the present disclosure is not limited to the above embodiments, and may further include more other equivalent embodiments without departing from the concept of the present disclosure. The scope of the present disclosure is determined by the scope of the appended claims.

What is claimed is:

1. A conductive fastening mechanism, comprising:
a nut (1) connected to an energy load module (11) and electrically connected to a power supply through a power switch S0;
an anti-rotating seat (2) located above the nut (1);
a conducting element (8) arranged in the anti-rotating seat (2) and electrically connected to a load (13);
a connecting piece (3) penetrating the anti-rotating seat (2) and the conducting element (8) and selectively connected to the nut (1), used for on-off between the load and the power supply;

a handle (4) rotatably arranged on the connecting piece (3), wherein the handle (4) is configured to be selectively clamped in the anti-rotating seat (2) to limit the connecting piece (3); and a rotating shaft (5), wherein the connecting piece (3) is provided with through holes, and two ends of the rotating shaft (5) are connected to the handle (4) and penetrate the through holes.

2. The conductive fastening mechanism according to claim 1, wherein the connecting piece (3) comprises:

a mounting portion (31), wherein the mounting portion (31) is provided with a mounting hole, the mounting hole is used for a wrench to penetrate, and the handle (4) is rotatably arranged on the mounting portion (31); and a screw (32) arranged at the bottom of the mounting portion (31), wherein the screw (32) penetrates the anti-rotating seat (2) and is in threaded connected with the nut (1).

3. The conductive fastening mechanism according to claim 1, wherein the anti-rotating seat (2) is provided with a via hole in an axial direction, and the connecting piece (3) penetrates the via hole.

4. The conductive fastening mechanism according to claim 1, wherein an outer wall of a lower end of the connecting piece (3) is provided with an external thread, and the nut (1) is internally provided with an internal thread matched with the external thread.

5. The conductive fastening mechanism according to claim 1, wherein the handle (4) comprises: a connecting portion (41) rotatably arranged on the connecting piece (3) through the rotating shaft (5); and a clamping portion (42) arranged on the connecting portion (41) and capable of being clamped to the anti-rotating seat (2).

6. The conductive fastening mechanism according to claim 5, wherein a cross section of the clamping portion (42) has a trapezoidal structure.

7. The conductive fastening mechanism according to claim 5, wherein an inner wall of the anti-rotating seat (2) is provided with clamping grooves (21), and the clamping portion (42) can be clamped in the clamping groove (21).

8. The conductive fastening mechanism according to claim 7, wherein at least two clamping blocks (22) are arranged on the inner wall of the anti-rotating seat (2), and the clamping groove (21) is formed between two adjacent clamping blocks (22).

9. The conductive fastening mechanism according to claim 7, wherein there are a plurality of clamping grooves (21), and the plurality of clamping grooves (21) are evenly arranged in a circumferential direction of the anti-rotating seat (2).

* * * * *